US011919389B2

(12) United States Patent
Yeo et al.

(10) Patent No.: US 11,919,389 B2
(45) Date of Patent: Mar. 5, 2024

(54) VEHICLE AND METHOD OF CONTROLLING VEHICLE SPEED AT A ROAD BRANCHING POINT

(71) Applicants: Hyundai Motor Company, Seoul (KR); Kia Corporation, Seoul (KR); Mando Mobility Solutions Corporation, Pyeongtaek-si (KR)

(72) Inventors: Sungyoon Yeo, Seoul (KR); Seunggeon Moon, Seoul (KR); Young Min Han, Gunpo-si (KR); Sungwoo Choi, Seoul (KR); Seo Hyeon Park, Suwon-si (KR); Inho Kim, Seoul (KR)

(73) Assignees: Hyundai Motor Company, Seoul (KR); Kia Corporation, Seoul (KR); MANDO MOBILITY SOLUTIONS CORPORATION, Pyeongtaek-si (KR)

( * ) Notice: Subject to any disclaimer, the term of this patent is extended or adjusted under 35 U.S.C. 154(b) by 161 days.

(21) Appl. No.: 17/524,082

(22) Filed: Nov. 11, 2021

(65) Prior Publication Data

US 2022/0161655 A1 May 26, 2022

(30) Foreign Application Priority Data

Nov. 23, 2020 (KR) .......................... 10-2020-0158157

(51) Int. Cl.
*B60K 31/00* (2006.01)
*B60Q 9/00* (2006.01)
(Continued)

(52) U.S. Cl.
CPC ............ *B60K 31/0066* (2013.01); *B60Q 9/00* (2013.01); *G01C 21/34* (2013.01); *G05D 1/0257* (2013.01);
(Continued)

(58) Field of Classification Search
None
See application file for complete search history.

(56) References Cited

U.S. PATENT DOCUMENTS 10,953,883 B2* 3/2021 Sakaguchi ......... B62D 15/0255
2021/0387619 A1* 12/2021 Yatagai ............... B60W 30/146

FOREIGN PATENT DOCUMENTS

KR 20190007638 A 1/2019

* cited by examiner

*Primary Examiner* — Todd Melton
(74) *Attorney, Agent, or Firm* — MORGAN, LEWIS & BOCKIUS LLP

(57) ABSTRACT

A vehicle includes a navigation device, and a controller electrically connected to the navigation device, wherein the controller is configured to determine a first speed of the vehicle based on a main line speed limit of a road on which the vehicle is traveling, wherein the main line speed limit is included in navigation information output by the navigation device, determine a second speed for decelerating the vehicle to a predetermined speed when the vehicle is positioned at a target point of a curved lane based on an arc length from a branching point of the road to the curved lane, which is determined based on the predetermined speed and a predetermined allowable maximum deceleration amount in the curved lane in route information included in the navigation information and the navigation information, and determine the first speed or the second speed as a control target speed of the vehicle at the branching point.

20 Claims, 11 Drawing Sheets

(51) Int. Cl.
    *B60W 50/00*     (2006.01)
    *G01C 21/34*     (2006.01)
    *G05D 1/00*     (2006.01)
    *G05D 1/02*     (2020.01)
    *G06V 20/56*     (2022.01)

(52) U.S. Cl.
    CPC .... *G06V 20/588* (2022.01); *B60K 2031/0091* (2013.01); *B60W 2050/0073* (2013.01); *B60W 2552/30* (2020.02)

VEHICLE AND METHOD OF CONTROLLING VEHICLE SPEED AT A ROAD BRANCHING POINT

CROSS-REFERENCE TO RELATED APPLICATION(S)

The present application claims priority to Korean Patent Application No. 10-2020-0158157, filed on Nov. 23, 2020, the entire contents of which is incorporated herein for all purposes by this reference.

BACKGROUND OF THE INVENTION

Field of the Invention

The present invention relates to a vehicle and a control method thereof.

Description of Related Art

A conventional curved road deceleration function of automatically decelerating a traveling speed of a vehicle when the vehicle enters a curved road has been developed.

When a route set by a navigation device of a vehicle includes a route in which the vehicle travels on a curved lane of an exit ramp, the vehicle decelerates the traveling speed from a main road with the conventional curved road deceleration function.

Unlike the navigation setting, when the vehicle continues to travel on the main road instead of the curved lane of the exit ramp by the manipulation of the driver, until the navigation device determines that the vehicle departs from the route, the vehicle decelerates the traveling speed to a predetermined safe speed in the curved lane of the exit ramp through the conventional curved road deceleration function. In the instant case, there is a risk that the vehicle may collide with a following vehicle traveling from behind, as well as obstruct the flow of traffic on the road.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle and a control method thereof configured for preventing collision with a rear vehicle or obstruction of the overall traffic flow due to a rapid deceleration of a traveling speed of the vehicle in a main line of a main road when a curve safety speed in an exit lane of the road is significantly low. For example, the vehicle according to the present invention and the control method thereof may prevent the traveling speed of the vehicle from automatically decelerating to a safe speed in a curved lane when the vehicle continues to travel on a main road by the manipulation of a driver although the route set by a navigation device of the vehicle includes a route in which the vehicle enters a curved lane of an exit ramp.

Additional aspects of the present invention will be set forth in part in the description which follows, and in part, will be obvious from the description, or may be learned by practice of the present invention.

In accordance with an aspect of the present invention, a vehicle includes a navigation device, and a controller electrically connected to the navigation device, wherein the controller is configured to determine a first speed of the vehicle based on a main line speed limit of a road on which the vehicle is traveling, wherein the main line speed limit is included in navigation information output by the navigation device, determine a second speed for decelerating the vehicle to a predetermined speed when the vehicle is positioned at a target point of a curved lane based on an arc length from a branching point of the road to the curved lane, which is determined based on the predetermined speed and a predetermined allowable maximum deceleration amount in the curved lane in route information included in the navigation information and the navigation information, and determine the first speed or the second speed as a control target speed of the vehicle at the branching point.

The controller may be configured to identify whether the branching point and the curved lane are included in recommended route information included in the navigation information and determine the first speed and the second speed based on the branching point and the curved lane included in the recommended route information.

The vehicle may further include at least one of a camera and a radar, wherein the controller may be configured to identify a lane of the road in which the vehicle is traveling based on surrounding information of the vehicle obtained through the at least one of the camera and the radar, and determine the first speed and the second speed based on the identified lane being a main line adjacent to an exit lane for entering the curved lane.

The vehicle may further include an output unit, wherein the controller may be configured to determine the first speed as the control target speed and controls the output unit to output a warning signal, when the controller concludes that the first speed is greater than the second speed.

The controller may be configured to determine the second speed as the control target speed when the controller concludes that the first speed is equal to or less than the second speed.

The controller may be configured to determine an acceleration to be applied to the vehicle based on a predetermined first distance between the vehicle and the branching point, a current speed of the vehicle and the control target speed.

The controller may be configured to determine the acceleration to be applied to the vehicle when the vehicle enters the branching point.

The controller may be configured to control the output unit to output a warning signal when the determined acceleration is less than a predetermined lowest acceleration.

The controller may be configured to control a speed of the vehicle to be a greater one of the first speed and the second speed when the vehicle is located at a predetermined first distance from the branching point in the identified lane.

The controller may be configured to control a speed of the vehicle when the vehicle enters an exit lane for entering the curved lane so that the speed of the vehicle becomes the predetermined speed when the vehicle enters the target point of the curved lane.

In accordance with an aspect of the present invention, a control method of a vehicle includes determining a first speed of the vehicle based on a main line speed limit of a road on which the vehicle is traveling, wherein the main line speed limit is included in navigation information output by a navigation device of the vehicle, determining a second speed for decelerating the vehicle to a predetermined speed when the vehicle is positioned at a target point of a curved lane based on an arc length from a branching point of the road to the curved lane, which is determined based on the predetermined speed and a predetermined allowable maximum deceleration amount in the curved lane in route information included in the navigation information and the navigation information, and determining the first speed or the second speed as a control target speed of the vehicle at the branching point.

The control method may further include identifying whether the branching point and the curved lane are included in recommended route information included in the navigation information, wherein the determining of the first speed and the second speed may be performed based on the branching point and the curved lane being included in the recommended route information.

The control method may further include identifying a lane of the road in which the vehicle is traveling based on surrounding information of the vehicle obtained through at least one of a camera and a radar, wherein the determining of the first speed and the second speed may be performed based on the identified lane being a main line adjacent to an exit lane for entering the curved lane.

When the first speed is greater than the second speed, the first speed may be determined as the control target speed, and an output unit of the vehicle may be controlled to output a warning signal.

When the first speed is equal to or less than the second speed, the second speed may be determined as the control target speed.

The control method may further include determining an acceleration to be applied to the vehicle based on a predetermined first distance between the vehicle and the branching point, a current speed of the vehicle and the control target speed.

The determining of an acceleration to be applied to the vehicle may be performed when the vehicle enters the branching point.

The control method may further include controlling the output unit to output a warning signal when the determined acceleration is less than a predetermined lowest acceleration.

The control method may further include controlling the speed of the vehicle to be a greater one of the first speed and the second speed when the vehicle is located at a predetermined first distance from the branching point in the identified lane.

The control method may further include controlling a speed of the vehicle when the vehicle enters an exit lane for entering the curved lane so that the speed of the vehicle becomes the predetermined speed when the vehicle enters the target point of the curved lane.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
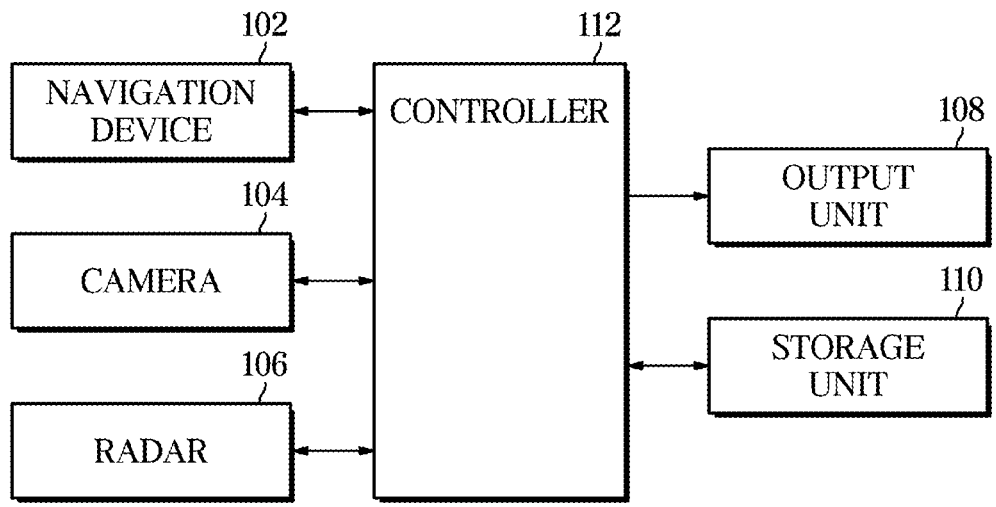
FIG. 1A and FIG. 1B are block diagrams of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. This specification does not describe all the elements of the embodiments, and duplicative contents between general contents or embodiments in the Field of the Invention of the present invention will be omitted. The terms 'part,' 'module,' 'member,' and 'block' used in the present specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to exemplary embodiments.

Throughout the specification, when a part is referred to as being "connected" to another part, it includes not only a direct connection but also an indirect connection, and the indirect connection includes connecting through a wireless network.

Furthermore, when it is described that a part "includes" an element, it means that the element may further include other elements, not excluding the other elements unless specifically stated otherwise.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states an order.

Hereinafter the present invention will be described in detail with reference to the accompanying drawings.

Figure 1B:
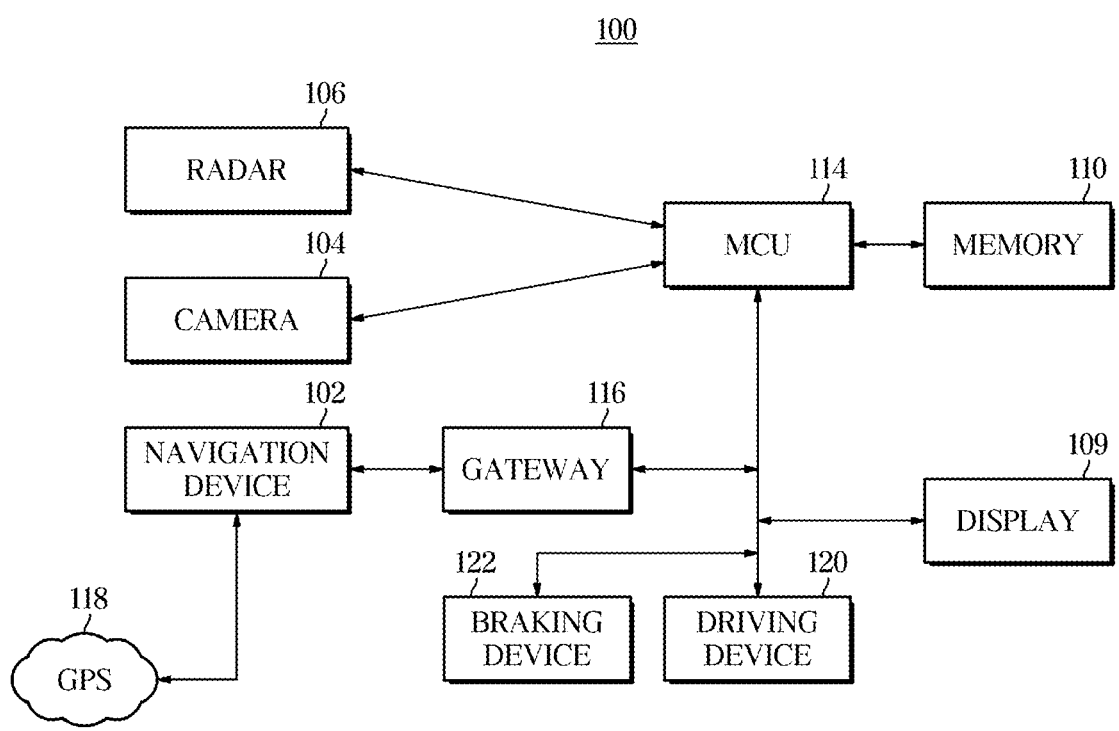
Figure 2:
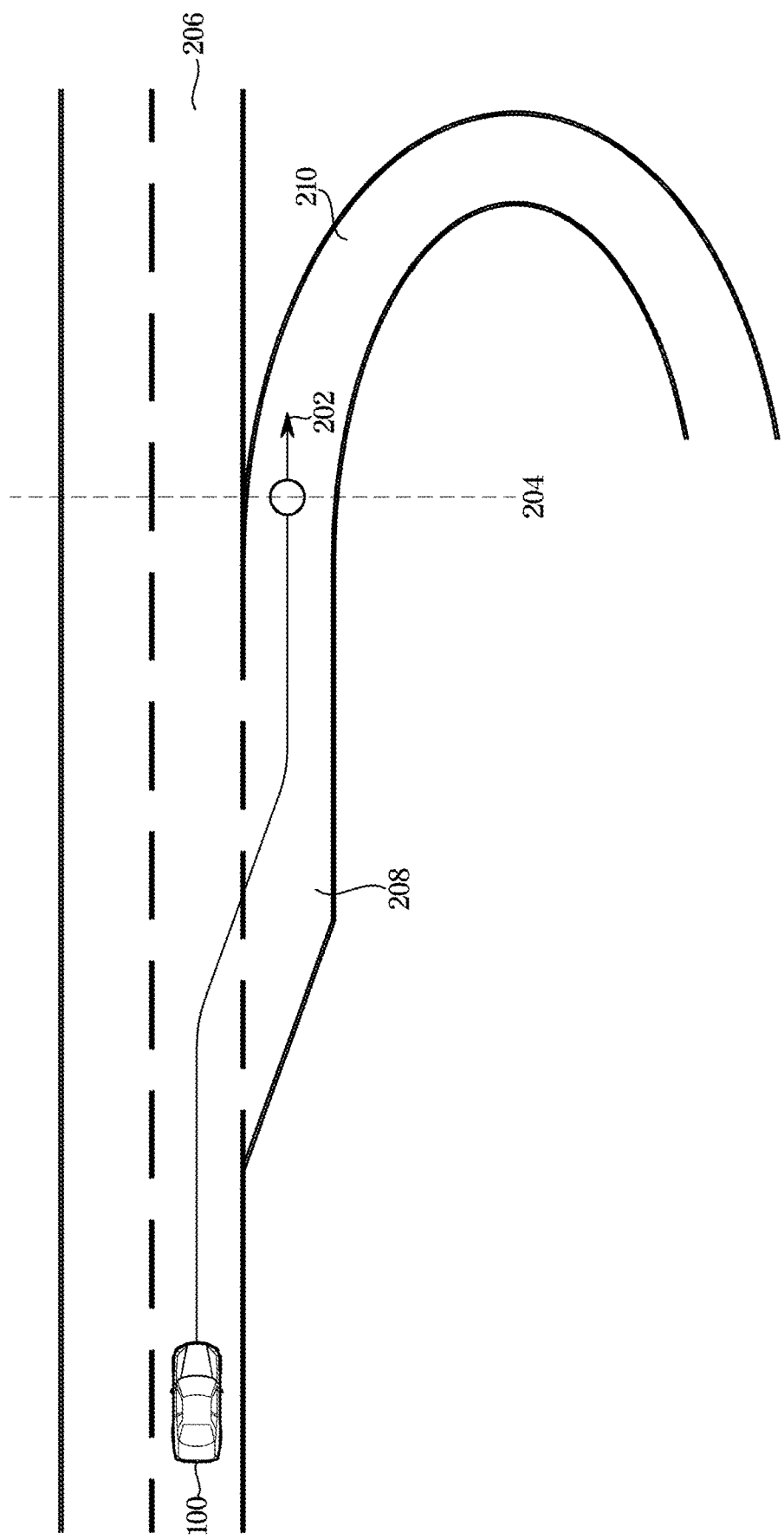
FIG. 2 is a diagram for explaining a traveling route of the vehicle according to various exemplary embodiments of the present invention.

FIG. 1A and FIG. 1B are block diagrams of a vehicle according to various exemplary embodiments of the present invention, and FIG. 2 is a diagram for explaining a traveling route of the vehicle according to an exemplary embodiment of the present invention.

Referring to FIG. 1A, a vehicle 100 may include a navigation device 102, at least one camera 104, at least one radar 106, an output unit 108, a storage unit 110 and/or a controller 112.

The navigation device 102 may output navigation information. The navigation information may include route information that provides a route to a destination input by a driver of the vehicle 100. The navigation information may include a type of road, a type of link, the total number of lanes of the road, and/or curvature information of the road on the route information.

The navigation device 102 may identify location information and driving environment information of the vehicle by matching the location coordinates of the vehicle identified through a satellite signal on a map previously stored in the storage unit 110, generating route information. For example, the navigation device 102 may include a global positioning system (GPS) to receive satellite signals propagating from GPS satellites through the GPS.

The at least one camera 104 may capture still images and moving images. The at least one camera 104 may include at least one image sensor and may acquire (also referred to as photographing) an image around the vehicle 100 based on the control of the controller 112.

The at least one camera 104 may obtain an image around the vehicle 100.

The at least one radar 106 may emit an electromagnetic wave and receive an echo of the electromagnetic wave reflected from the surface of an object to identify a distance from and/or direction of the object. For example, the at least one radar 106 may detect an object located in the vicinity of the vehicle 100. For example, the controller 112 may identify a stationary object and/or a moving object around the vehicle 100 based on output information of the at least one radar 106.

For example, the controller 112 may identify a lane in which the vehicle 100 is traveling, a type of the lane, a color of the lane, and/or a moving object (e.g., a vehicle in front of driving), based on surrounding information of the vehicle 100 obtained through the at least one camera 104 and/or the at least one radar 106. The surrounding information may include a surrounding image of the vehicle 100, a distance from and/or a direction of an object positioned around the vehicle 100, and the like.

The output unit 108 may include a speaker and/or a display device.

The output unit 108 may output the navigation information of the navigation system 102 audibly and/or visually. The output unit 108 may output a warning signal audibly and/or visually based on the control signal of the controller 110.

The storage unit 110 may be implemented as at least one of a non-volatile memory device such as a cache, a Read Only Memory (ROM), a Programmable ROM (PROM), an Erasable Programmable ROM (EPROM), an Electrically Erasable Programmable ROM (EEPROM), and a flash memory, a volatile memory device such as a Random Access Memory (RAM), and a storage medium such as a Hard disk drive (HDD) and a CD-ROM, but is not limited thereto.

The controller 112 (also referred to as a control circuit or processor) may control at least one other component of the vehicle 100 (e.g., a hardware component such as the navigation device 102, the at least one camera 104, the at least one radar 106, the output unit 108 and/or the storage unit 110) or a software component (software program), and may process and operate various data. The controller 112 may include an electronic control unit (ECU) that controls a power system of the vehicle 100. The controller 112 may include a processor and a memory.

When route information 202 set by the navigation device 102 includes first route information for inducing the vehicle 100 to travel in an exit lane 208 for entering a curved lane 210, which is a lane separate from a main line 206 at a branching point 204 of a road, as illustrated in FIG. 2, the controller 112 may control the speed of the vehicle 100 on the assumption that the vehicle 100 is traveling in accordance with the route information 202.

The controller 112 may control to decelerate the speed of the vehicle 100 based on the route information 202 of the navigation device 102, whether a lane of a road in which the vehicle 100 is traveling before entering the exit lane 208 is a main line, a distance between the vehicle 100 and the branching point 204, and the like.

The controller 112 may determine a first speed of the vehicle based on a main line speed limit of a road on which the vehicle 100 is traveling. The main line speed limit of the road on which the vehicle 100 is traveling may be included in the navigation information output by the navigation device 102.

The controller 112 may determine a second speed based on a predetermined safe speed and a predetermined allowable maximum deceleration amount in the curved lane on the route information included in the navigation information, and an arc length from a branching point of a road to a curved lane. The arc length from a branching point of a road to a curved lane may be determined based on navigation information. The second speed may be a speed at which the vehicle 100 may be decelerated to the predetermined safe speed when the vehicle 100 is positioned at a specific target point of the curved lane.

The controller 112 may control the speed of the vehicle 100 by determining the first speed or the second speed as a control target speed of the vehicle 100 at the branching point.

The controller 112 in the above-described embodiment may exist inside a camera system or a radar system and may be configured separately, and in the instant case, may perform the function of a domain control unit which is an integrated controller.

Referring to FIG. 1B, the vehicle 100 may include the navigation device 102, the camera 104, a radar 106, a display 109, a memory 110, and a micro control unit (MCU) 114, a gateway 116, a GPS 118, a driving device 120, and/or a braking device 122.

The navigation device 102, the camera 104, and the GPS 118 have been described in detail with reference to FIG. 1A, and thus a description thereof will be omitted.

The radar 106 may identify the distance to an object through laser light.

The display 109 may visually provide information to a user (e.g., a driver) of the vehicle 100. The display 109 may include a touch screen, and may receive, for example, a touch input using a part of the user's body, a gesture, a proximity, or a hovering input.

The memory 110 may be the storage unit 110 of FIG. 1A.

The MCU 114 may be included in the controller 112 of FIG. 1A, and may control at least one other component of the vehicle 100 (e.g., a hardware component such as the navigation device 102, the camera 104, the radar 106, the display 109, the memory 110, the gateway 116, the GPS 118, the driving device 120, and/or the braking device 122) or a software component (software program), and may process and operate various data.

For example, the MCU 114 may transmit a control signal to the navigation device 102 through the gateway 116 and may receive signals related to various data from the navigation device 102 through the gateway 116.

The driving device 120 moves the vehicle 100 and may include, for example, an engine, an engine management system (EMS), a transmission, and a transmission control unit (TCU). The engine may generate power for driving the vehicle 100, and the engine management system may control the engine in response to the driver's intent to accelerate through an accelerator pedal or a request from a driver assistance device. The transmission may transmit power generated by the engine to wheels, and the transmission control unit may control the transmission in response to a shift command from the driver through a shift lever and/or a request from the driver assistance device. The braking device 122 may stop the vehicle 100 and may include, for example, a brake caliper and an electronic brake control module (EBCM).

The brake caliper may decelerate the vehicle 100 or stop the vehicle 100 by use of friction with a brake disc, and the electronic brake control module may control the brake caliper in response to the driver's intent to brake through a brake pedal and/or a request from a driver assistance device.

For example, the electronic brake control module may receive a deceleration request including a deceleration amount from the driver assistance device and may control the brake caliper electrically or hydraulically to decelerate the vehicle 100 depending on the requested deceleration amount.

Hereinafter, speed control of the vehicle 100 will be described in detail with reference to FIG. 3, FIG. 4, FIG. 5, FIG. 6, FIG. 7, FIG. 8, FIG. 9, FIG. 10 and FIG. 11.

Figure 3:
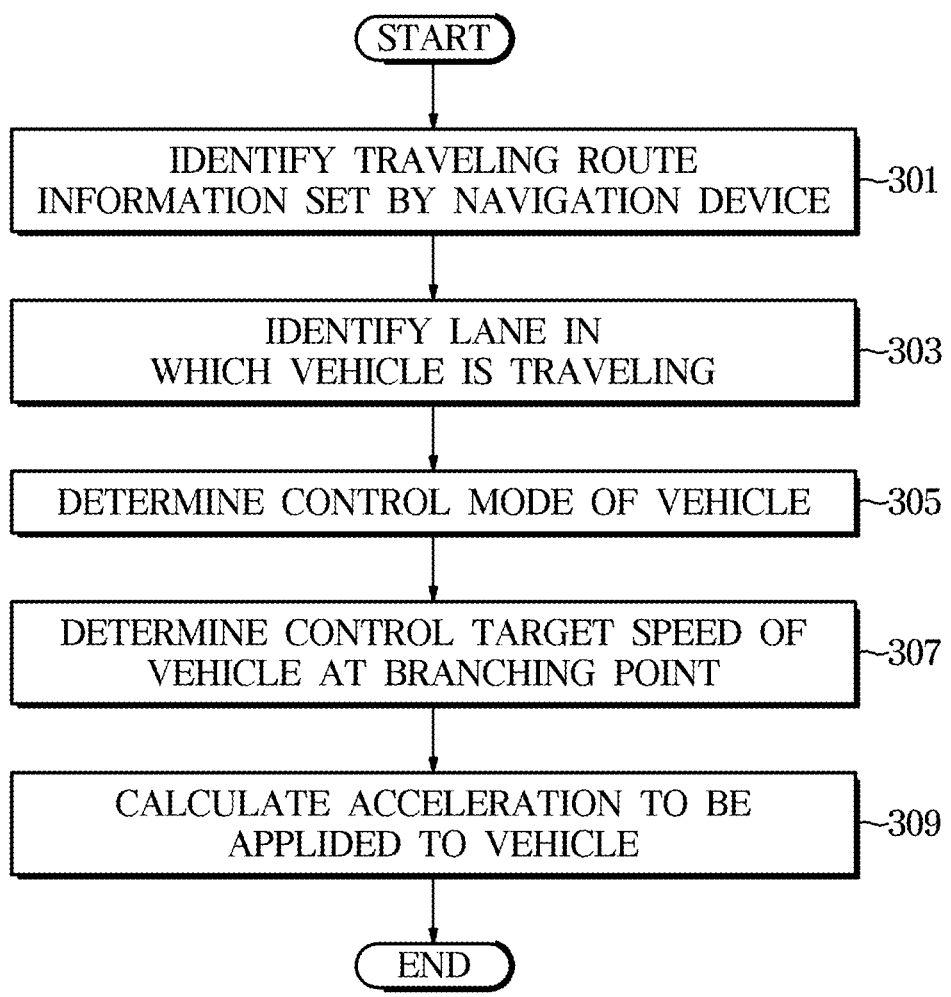
FIG. 3 is a flowchart of an operation of the vehicle according to various exemplary embodiments of the present invention.

FIG. 3 is a flowchart of an operation of the vehicle 100 (or the controller 112 of the vehicle 100) according to an exemplary embodiment of the present invention.

The vehicle 100 may identify navigation information output by the navigation device 102 of the vehicle 100 (301).

The navigation information may include route information providing a route to a destination input from the driver of the vehicle 100 and the main line speed limit of a road on which the vehicle 100 is traveling.

The vehicle 100 may identify a lane in which the vehicle 100 is traveling on a road (303).

The vehicle 100 may identify a lane in which the vehicle 100 is traveling based on the surrounding information of the vehicle 100 obtained through the at least one camera 104 and/or the at least one radar 106.

The vehicle 100 may determine a control mode of the vehicle 100 (305).

The control mode of the vehicle 100 may include a standby mode, a pre-entry control mode, and a normal control mode.

The standby mode refers to a ready state that satisfies the operation conditions of the vehicle 100 except for a specific target road for speed control of the vehicle 100.

The specific target road may include the curved lane 210 connected to the exit lane 208 included in the route information set by the navigation device 102.

The pre-entry control mode refers to a state that satisfies the following two conditions.

A first condition is that the route information set by the navigation device 102 includes first route information for inducing the vehicle 100 to travel in the exit lane 208 for entering the curved lane 210, which is a lane separate from the main line 206 at the branching point 204 of the road, as illustrated in FIG. 2.

A second condition refers to a case in which the vehicle 100 is traveling in the main line 206 right next to the exit lane 208.

For example, the vehicle 100 may determine, based on the satisfaction of the above two conditions, that the specific target road is the curved lane 210 connected to the exit lane 208 included in the route information set by the navigation device 102, and thus may perform operations for speed control of the vehicle 100, which will be described later.

The normal control mode refers to a state in which the vehicle 100 control to travel at a safe speed when the vehicle 100 travels in the curved lane 210. For example, the normal control mode refers to a state in which the vehicle 100 controls the speed of the vehicle 100 so that the speed of the vehicle 100 may be decelerated to a safe speed when the vehicle 100 travels in the curved lane 210 and reaches the target point of the curved lane 210.

The vehicle 100 may determine a control target speed Vp of the vehicle 100 at the branching point 204 to control the traveling speed of the vehicle 100 to be decelerated (307).

When the control mode of the vehicle 100 is the pre-entry control mode, the vehicle 100 may determine the control target speed Vp. The vehicle 100 may determine the control target speed Vp of the vehicle 100 based on the assumption that the vehicle 100 travels with the first route information set by the navigation device 102.

The control target speed Vp may refer to controlling the speed of the vehicle 100 in advance so that the vehicle 100 may travel at the predetermined safe speed at a target point of the curved lane 210.

The vehicle 100 may determine an acceleration to be applied to the vehicle 100 (309).

The vehicle 100 may determine an acceleration to be applied to the vehicle 100 when the vehicle 100 enters the branching point 204.

The acceleration to be applied to the vehicle 100 may be an acceleration that enables the speed of the vehicle 100 to be decelerated to the predetermined safe speed at a target point of the curved lane 210.

In addition to the above-described embodiment, the vehicle 100 may determine whether to output a warning signal for a prior warning to the driver based on the determined target control speed Vp. For example, the vehicle 100 may, based on the determined control target speed Vp, control the output unit 108 to output a warning signal by identifying a case in which the vehicle 100 needs to early and/or rapidly enter the exit lane 208, and the like.

Furthermore, in addition to the above-described embodiment, based on the acceleration to be applied to the vehicle 100, the vehicle 100 may determine whether to output a warning signal for a prior warning to the driver. For example, when the acceleration to be applied to the vehicle 100 determined after the vehicle 100 enters the exit lane 208 is less than a predetermined lowest acceleration, the vehicle 100 may output a warning signal so that the driver controls the braking device 122 of the vehicle 100 to decelerate the speed of the vehicle 100.

According to the above-described embodiment, based on the control target speed Vp, the vehicle 100 control to decelerate the speed of the vehicle 100 from a predetermined first distance between the branching point 204 and the vehicle 100, so that the vehicle 100 may travel at the control target speed Vp when passing the branching point 204.

Figure 4:
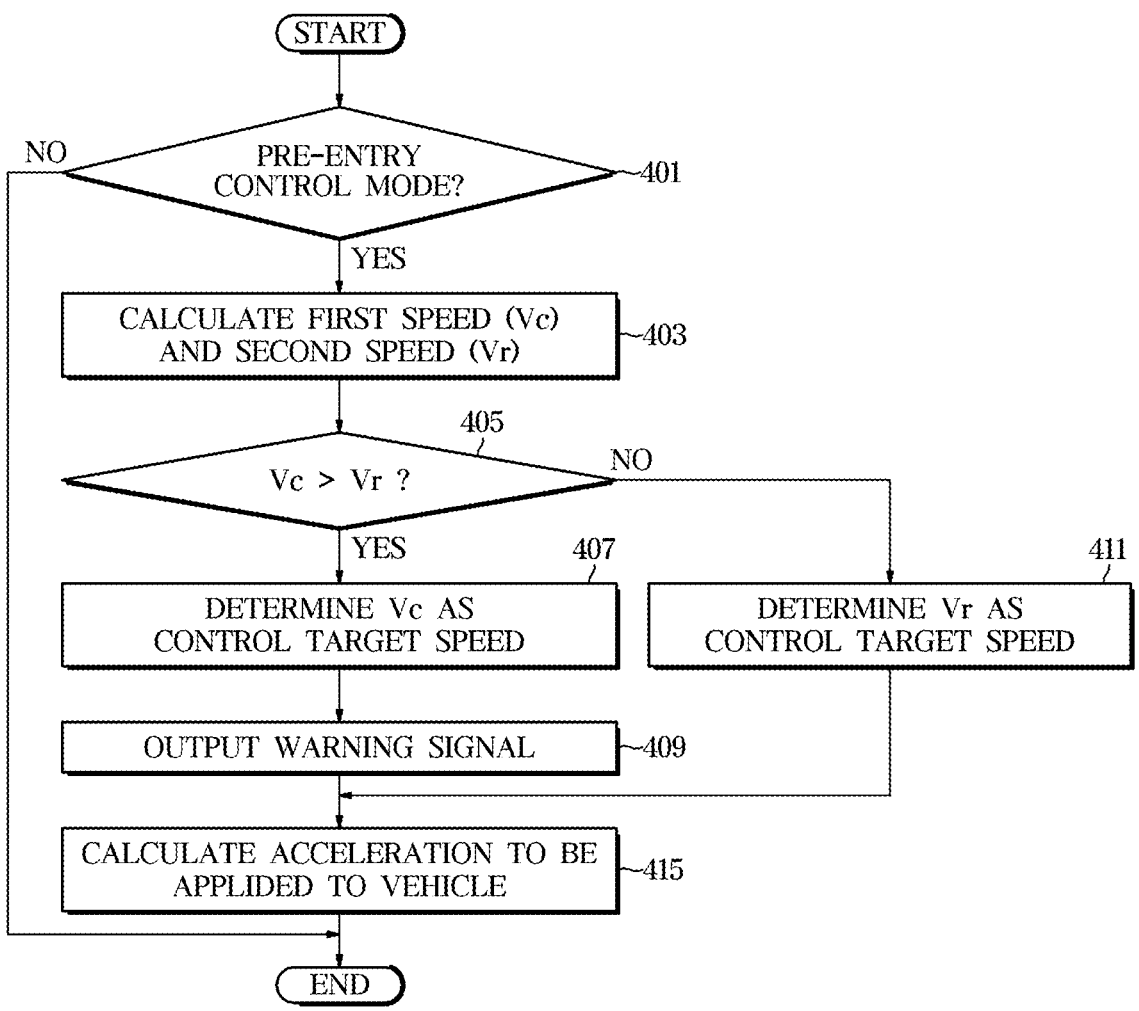
FIG. 4 is a flowchart of a control operation of the vehicle according to various exemplary embodiments of the present invention.
Figure 5:
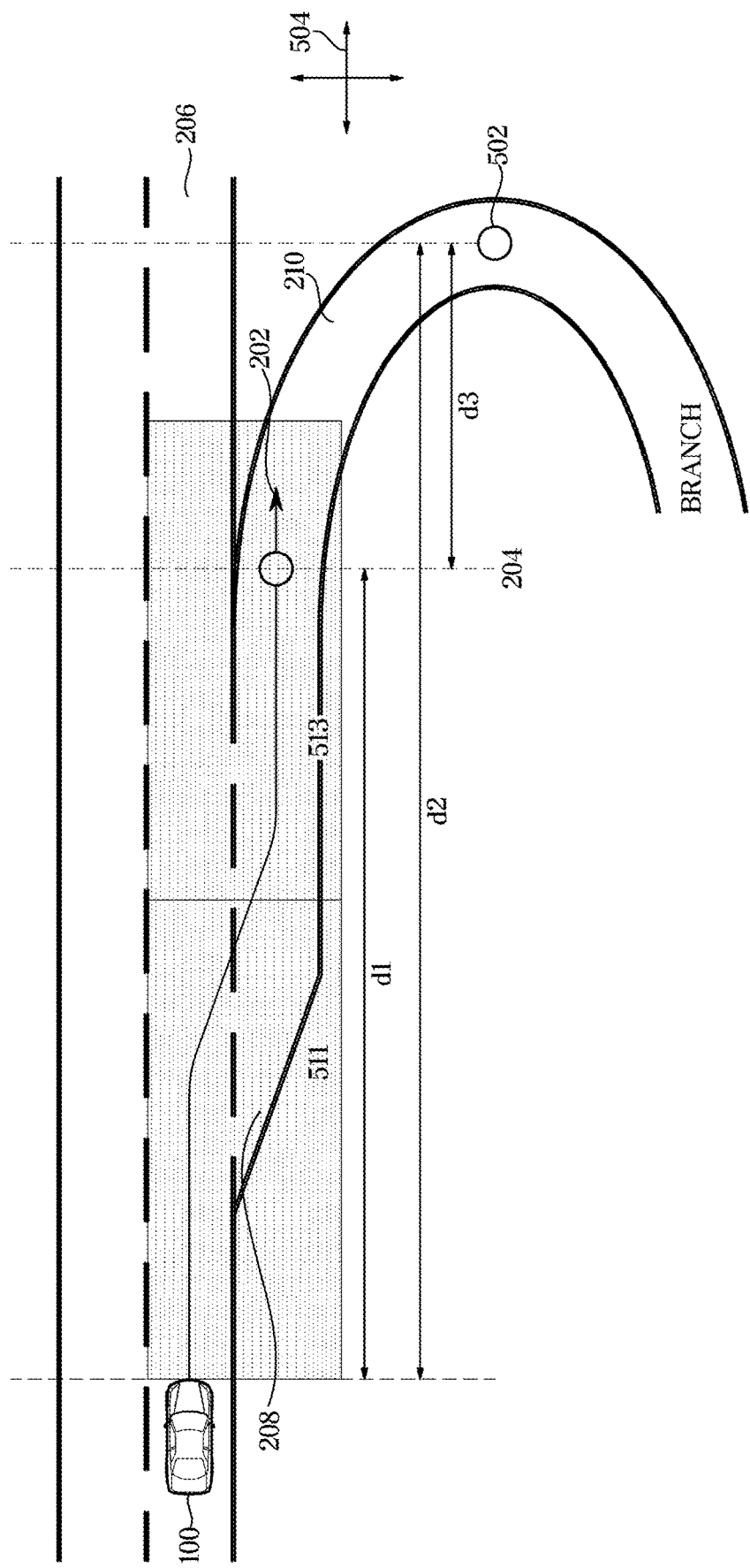
FIG. 5 is a diagram for explaining the control operation of the vehicle according to various exemplary embodiments of the present invention.

FIG. 4 is a flowchart of a control operation of the vehicle 100 (or the controller 112 of the vehicle 100) according to various exemplary embodiments of the present invention, and FIG. 5 is a diagram for explaining the control operation of the vehicle 100 according to an exemplary embodiment of the present invention.

In operation 401, the vehicle 100 may identify whether the control mode of the vehicle 100 is the pre-entry control mode.

Referring to FIG. 5, the vehicle 100 may identify whether the branching point 204 and the curved lane 210 are included in the route information 202 set by the navigation device 102. The vehicle 100 may identify a lane in which the vehicle 100 is traveling on a road and may identify whether the lane in which the vehicle 100 is traveling is the main line 206 right next to the exit lane 208 for entering the curved lane 210.

The vehicle 100 may identify that the control mode of the vehicle 100 is the pre-entry control mode based on the route information 202 set by the navigation device 102 including the branching point 204 and the curved lane 210 and the lane in which the vehicle 100 is traveling is the main line 206 right next to the exit lane 208, as illustrated in FIG. 5.

The vehicle 100 performs operation 403 when the control mode of the vehicle 100 is the pre-entry control mode, and otherwise may end portion the operation of the exemplary embodiment of the present invention.

In operation 403, the vehicle 100 may determine a first speed Vc and a second speed Vr.

The vehicle 100 may determine the first speed Vc of the vehicle 100 based on the main line speed limit of the road on which the vehicle 100 is traveling. The first speed Vc refers to a pre-controlled minimum speed for preventing a collision with a rear vehicle traveling in the rear of the vehicle 100 and preventing traffic flow obstruction.

The vehicle 100 may identity the main line speed limit of the road on which the vehicle 100 is traveling, which is included in the navigation information of the navigation device 102.

The vehicle 100 may determine the first speed Vc based on Equation 1 below.

$$Vc = c \times V_l$$ [Equation 1]

(c: predetermined constant less than 1 (0<c<1), $V_l$: main line speed limit of the road on which the vehicle is traveling)

A value of the predetermined constant c in Equation 1 may be different for each type of road. For example, c on a highway may be set to a larger value than on an exclusive road for automobiles.

The vehicle 100 may determine the second speed Vr of the vehicle 100 based on the predetermined safe speed in the curved lane 210, the predetermined allowable maximum deceleration amount of the vehicle 100 in the curved lane 210, and the arc length from the branching point 204 of the road to the curved lane 210.

Referring to FIG. 5, the second speed Vr refers to a speed at which the vehicle 100 may be decelerated to the predetermined safe speed when the vehicle 100 is positioned at the target point 502 of the curved lane 210. For example, the second speed Vr refers to a speed at which the vehicle 100 may be decelerated to the predetermined safe speed when the vehicle 100 decelerates to the predetermined allowable maximum deceleration amount of the vehicle 100 when entering the exit lane 208 from the last point which may enter the exit lane 208 so that the vehicle 100 is located at the target point 502 of the curved lane 210.

The target point 502 may be a point of the curved lane 210 located at the furthest distance from the branching point 204 of the road in a horizontal direction 504 as illustrated in FIG. 5.

The vehicle 100 may identify the predetermined safe speed in the curved lane 210 and the predetermined allowable maximum deceleration amount of the vehicle 100 in the curved lane 210 by identifying the curved lane 210 and the target point 502 of the curved lane 210 included in the route information 202 of the navigation device 102.

The predetermined safe speed in the curved lane 210 may be a value stored in the storage unit 110. For example, a safety speed may be predetermined for each of the curved lanes and stored in the storage unit 110. For example, curved lanes may be classified by type and/or location, and a corresponding safe speed may be predetermined and stored in the storage unit 110. Furthermore, the predetermined safe speeds corresponding to the respective curved lanes may be stored in a table format. Accordingly, the controller 112 may identify the predetermined safe speed in the curved lane 210 included in the traveling route 202 of the vehicle 100 among the predetermined safe speeds for the respective curved lanes stored in the storage unit 110.

The allowable maximum deceleration amount of the vehicle 100 in the curved lane 210 may be a value which is predetermined and stored in the storage unit 110.

The vehicle 100 may determine a distance from the branching point 204 of the road to the curved lane 210, that is, an arc length $d_3$ from the branching point 204 of the road to the target point 502 of the curved lane 210, as illustrated in FIG. 5, based on the route information 202 of the navigation device 102.

Referring to FIG. 5, the arc length $d_3$ from the branching point 204 of the road to the curved lane may be determined by the vehicle 100 based on a predetermined first distance $d_1$ between the vehicle 100 and the branching point 204 and a second distance $d_2$ between the vehicle 100 and the curved lane 210.

The first distance $d_1$ may be a predetermined distance between the branching point 204 and a point on the road before the vehicle 100 passes the exit lane 208 and may be stored in the storage unit 110. The second distance $d_2$ may be a predetermined distance between the target point 502 and a point on the road before the vehicle 100 passes the exit lane 208. The vehicle 100 may determine the arc length $d_3$ from the branching point 204 of the road to the curved lane by subtracting the first distance $d_1$ from the second distance $d_2$.

For example, the vehicle 100 may determine the second speed Vr based on Equation 2 below.

$$v_r = \sqrt{v_t^2 - 2a_{max}d_3}$$ [Equation 2]

(Vr: second speed, Vt: predetermined safety speed in the curved lane, $a_{max}$: allowable maximum deceleration amount of the vehicle; $d_3$: arc length from the branching point of the road to the curved lane)

The vehicle 100 may identify whether the first speed Vc is greater than the second speed Vr (405).

When the first speed Vc is greater than the second speed Vr, the vehicle 100 may perform operation 407, and otherwise may perform operation 411.

The vehicle 100 may determine the first speed Vc as the control target speed Vp (407).

The control target speed Vp refers to a speed for pre-deceleration control of the vehicle 100 and may be a speed targeted by the vehicle 100 when the vehicle 100 passes the branching point 204 of the curved lane 210 by decelerating the traveling speed of the vehicle 100.

The vehicle 100 may output a warning signal (409).

The vehicle 100 may output a warning signal in response to the first speed Vc being greater than the second speed Vr. For example, the vehicle 100 may control the output unit 108 to output a warning signal.

That the first speed Vc is determined as the control target Vp in response to the first speed Vc being greater than the second speed Vr may mean that the vehicle 100 may not decelerate to the predetermined safe speed when located at the target point 502 of the curved lane 210. Accordingly, when the vehicle 100 travels to pass the branching point 204 by entering the exit lane 208, the vehicle 100 is required to decelerate beyond the predetermined lowest acceleration also referred to as the lowest required acceleration) to be applied to the vehicle 100, and thus the vehicle 100 may inform the driver such that the vehicle 100 may rapidly enter the exit lane 208 by outputting a warning signal in advance.

The vehicle 100 may determine the second speed Vr as the control target speed Vp (411).

The vehicle 100 may determine an acceleration to be applied to the vehicle 100 (415).

The vehicle 100 may determine an acceleration to be applied to the vehicle 100 in response to the performance of operation 409 or operation 411. The vehicle 100 may determine an acceleration to be applied to the vehicle 100 when the vehicle 100 enters the branching point 204.

The acceleration to be applied may also be referred to as a required acceleration and may be determined such that the vehicle 100 travels at the control target speed Vp at the branching point 204.

The vehicle 100 may determine an acceleration to be applied to the vehicle based on the predetermined first distance between the vehicle 100 and the branching point 204, the current speed of the vehicle 100, and the control target speed.

For example, the vehicle 100 may determine the acceleration a to be applied to the vehicle 100 based on Equation 3 below.

$$a = \frac{v_p^2 - v_i^2}{2d_1}$$ [Equation 3]

(a: acceleration to be applied to the vehicle, Vp: control target speed, Vi: current speed of the vehicle, d1: predetermined distance between the vehicle and the branching point)

Operations 407 and 409 in the above-described embodiment of FIG. 4 may be sequentially or simultaneously performed after operation 405.

According to the above-described embodiment of FIG. 4, the vehicle 100 may output a warning signal in response to the first speed Vc being greater than the second speed Vr, while the vehicle 100 may not output a warning signal when the first speed Vc is equal to or less than the second speed Vr.

According to the above-described embodiment, when the vehicle 100 is located at the predetermined first distance from the branching point 204 while traveling the main line 206 right next to the exit lane 208 for entering the curved lane 210, the vehicle 100 may control the speed of the vehicle 100 (or referred to as deceleration control) so that the vehicle 100 passes the branching point 204 at the greater one of the first speed Vc and the second speed Vr.

That the vehicle 100 performs deceleration control so that the vehicle 100 passes the branching point 204 at the greater one of the first speed. Vc and the second speed Vr may mean that the vehicle 100 performs operation 511 as the pre-entry control mode.

According to the above-described embodiment, when the vehicle 100 enters the exit lane 208 or after the vehicle 100 enters the exit lane 208, the vehicle 100 may perform deceleration control so that the vehicle 100 passes the target point 502 of the curved lane 210 at the predetermined safe speed in the curved lane 210.

That the vehicle 100 performs deceleration control so that the vehicle 100 passes the target point 502 of the curved lane 210 at the predetermined safe speed in the curved lane 210 may mean that the vehicle 100 performs operation 513 as the normal control mode.

In addition to the above-described embodiment, when the vehicle 100 enters the branching point 204, for example, when the vehicle enters the exit lane 208 to control the speed of the vehicle 100 to be decelerated, in a case where the determined acceleration to be applied to the vehicle 100 is less than the predetermined lowest acceleration (also referred to as the lowest required acceleration) to be applied to the vehicle 100, the vehicle 100 may generate a warning signal to induce the driver to directly decelerate the speed of the vehicle 100.

The above-described embodiment may be executed when the vehicle 100 operates with a smart cruise control (SCC) function.

In the instant case, the vehicle 100 may perform the above-described control operation only when the control target speed Vp is less than a set speed in the smart cruise control function of the vehicle 100. For example, only when the control target speed Vp is less than the speed set in the smart cruise control function of the vehicle 100, operations 409 and 415, and the speed control operation of the vehicle may be performed.

The vehicle 100 may determine and output a smaller value as an acceleration to be finally applied to the vehicle 100 based on the comparison of the determined acceleration to be applied to the vehicle 100 with the acceleration to be applied according to the execution of the smart cruise control function.

In addition to the above-described embodiment, the vehicle 100 may control the speed of the vehicle 100 to a predetermined basic speed when the vehicle 100 continues to travel on the main line 206 without entering the exit lane 208. The basic speed may be a predetermined value according to setting of the driver or a value Which is automatically predetermined and stored in the storage unit 110 based on the main line speed limit of a road on which the vehicle 100 is traveling.

In addition to the above-described embodiment, when the vehicle 100 continues to travel in the main line 206 next to the exit lane 208 without entering the exit lane 208 until the vehicle 100 has passed the predetermined third distance from the branching point 204, the vehicle 100 may output a warning signal. The predetermined third distance may be a distance at which the vehicle 100 may enter the exit lane 208 based on the current speed of the vehicle 100, or a distance stored in the storage unit 110.

FIG. 6, FIG. 7, FIG. 8, FIG. 9, FIG. 10, and FIG. 11 are diagrams for explaining operations of the vehicle 100 based on driving states of the vehicle 100 according to an exemplary embodiment of the present invention.

Figure 6:
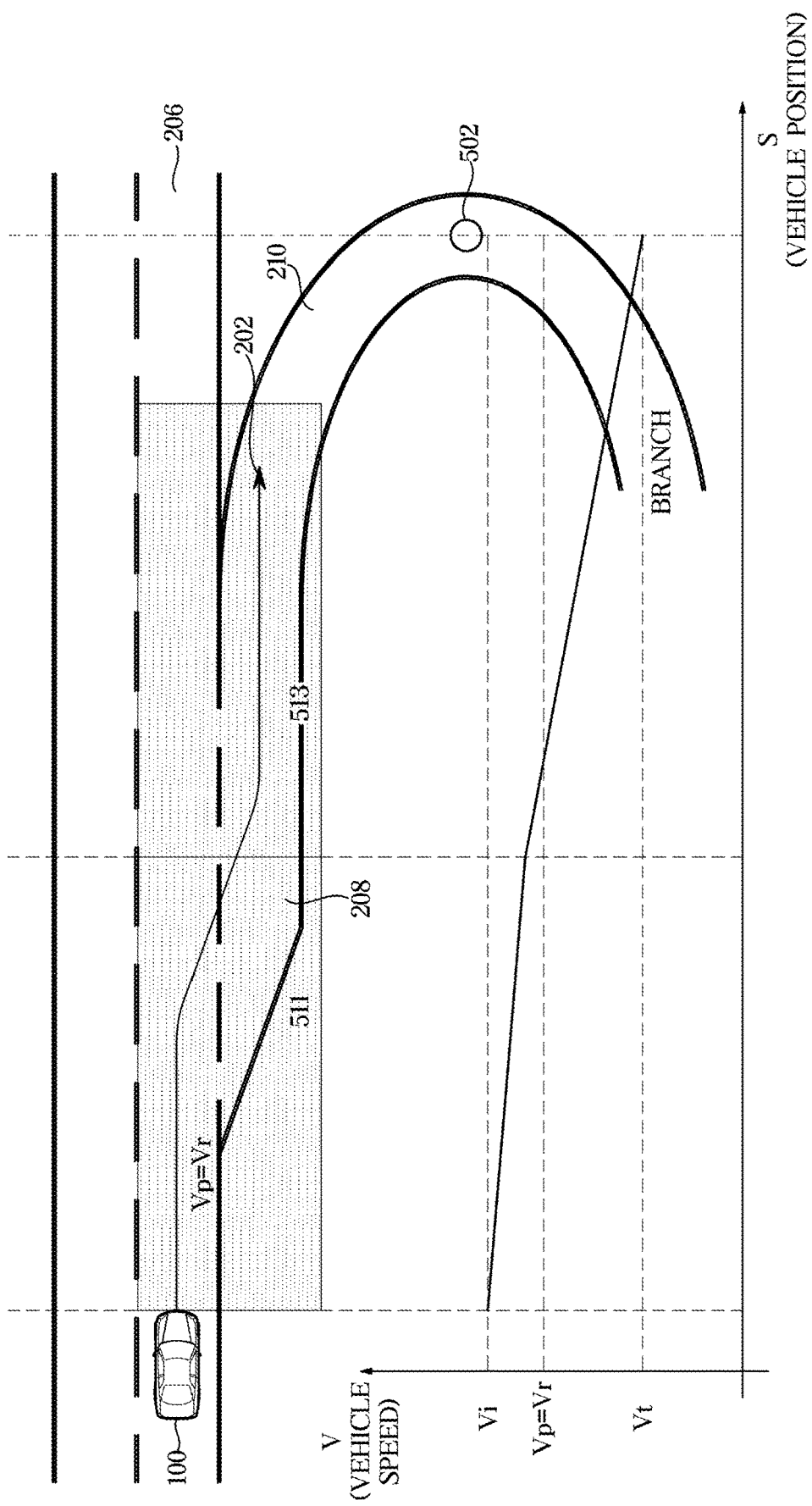
FIG. 6, FIG. 7, FIG. 8, FIG. 9, FIG. 10, and FIG. 11 are diagrams for explaining operations of the vehicle based on driving states of the vehicle according to an exemplary embodiment of the present invention.

FIG. 6 is a diagram for explaining an operation of the vehicle 100 when the vehicle 100 travels in the exit lane 208 in accordance with the route information 202 set by the navigation device 102 and identifies that the second speed Vr is greater than the first speed Vc.

Hereinafter, it is referred to as the first condition that the vehicle 100 travels in the exit lane 208 in accordance with the route information 202 set by the navigation device 102 and identifies that the second speed Vr is greater than the first speed Vc.

As illustrated in FIG. 6, when the vehicle 100 travels according to the first condition, a graph of a vehicle speed V for a vehicle position S may be generated.

Referring to FIG. 6, when the vehicle 100 is located at the predetermined first distance from the branching point 204 while traveling in the main line 206 right next to the exit lane 208 for entering the curved lane 210, the vehicle 100 may perform the operation 511 in the pre-entry control mode for controlling the speed of the vehicle 100 to be decelerated so that the speed of the vehicle 100 becomes the second speed Vr.

When or after the vehicle 100 enters the exit lane 208, the vehicle 100 may perform the operation 513 in the normal control mode for controlling the vehicle to be decelerated so that the speed of the vehicle 100 becomes the predetermined safe speed in the curved lane 210 at the target point 502 of the curved lane 210.

Figure 7:
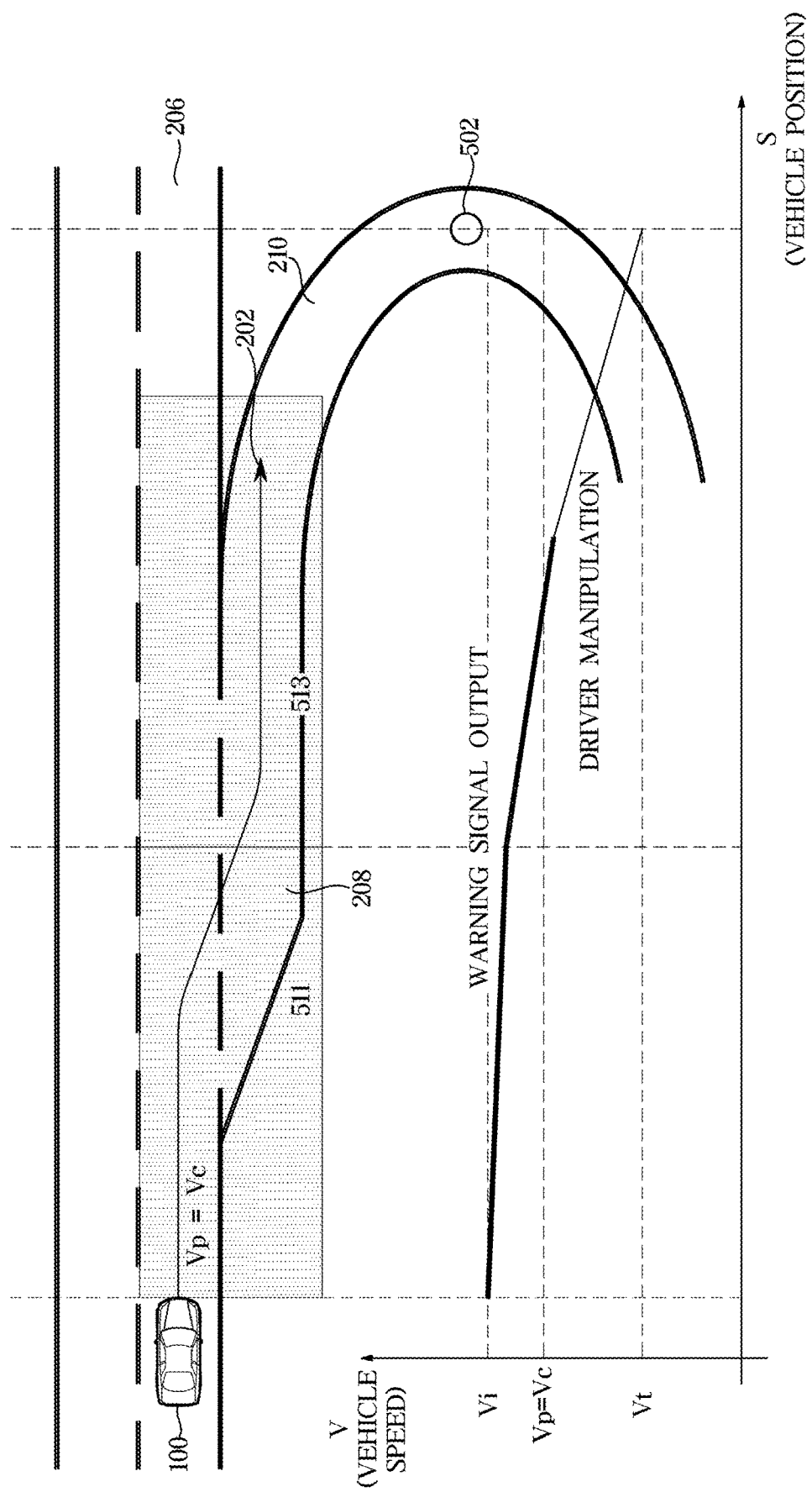
Figure 8:
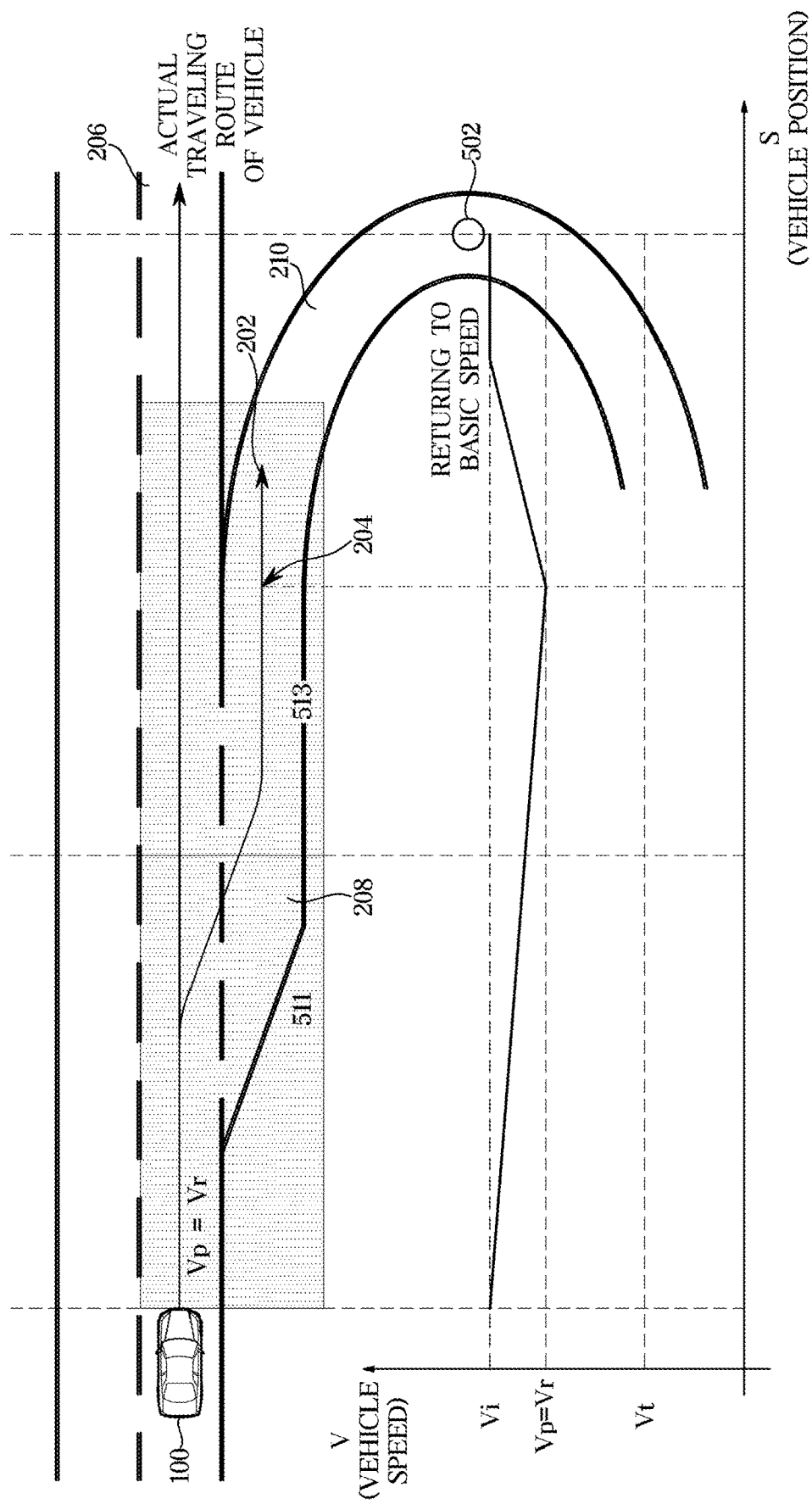

FIG. 7 and FIG. 8 are diagrams for explaining operations of the vehicle 100 when the vehicle 100 travels in the exit lane 208 in accordance with the route information 202 set by the navigation device 102 and identifies that the first speed Vc is greater than the second speed Vr.

Hereinafter, it is referred to as the second condition that the vehicle 100 travels in the exit lane 208 in accordance with the route information 202 set by the navigation device 102 and identifies that the first speed Vc is greater than the second speed Vr.

As illustrated in FIG. 7 or 8, when the vehicle 100 travels according to the second condition, a graph of the vehicle speed V for the vehicle position S may be generated.

Referring to FIG. 7, when the vehicle 100 is located at the predetermined first distance from the branching point 204 while traveling in the main line 206 right next to the exit lane 208 for entering the curved lane 210, the vehicle 100 may perform the operation 511 in the pre-entry control mode for controlling the speed of the vehicle 100 to be decelerated so that the speed of the vehicle 100 becomes the first speed Vc. In the instant case, an entry timing of the vehicle 100 into the exit lane 208 is delayed, so that the speed of the vehicle 100 in the curved lane 210 may not match the predetermined safe speed in the curved lane 210. Accordingly, the vehicle 100 outputs a warning signal for a predetermined time period when located at the first distance, so that the vehicle 100 may induce the driver to manipulate the steering wheel and the like of the vehicle 100 to rapidly enter the vehicle 100 into the exit lane 208.

When the determined acceleration to be applied to the vehicle 100 as the vehicle 100 enters the exit lane 208 is less than the predetermined lowest acceleration, the vehicle 100 may generate a warning signal to induce the driver to manipulate the vehicle 100 so that the speed of the vehicle 100 is decelerated.

Referring to FIG. 8, when the vehicle 100 is located at the predetermined first distance from the branching point 204 while traveling in the main line 206 adjacent to the exit lane 208 for entering the curved lane 210, the vehicle 100 may perform the operation 511 in the pre-entry control mode for controlling the speed of the vehicle 100 to be decelerated so that the speed of the vehicle 100 becomes the first speed Vc. In the instant case, an entry timing of the vehicle 100 into the exit lane 208 is delayed, so that the speed of the vehicle 100 in the curved lane 210 may not match the predetermined safe speed in the curved lane 210. Accordingly, the vehicle 100 outputs a warning signal for a predetermined time period when located at the first distance, so that the vehicle 100 may induce the driver to manipulate the steering wheel and the like of the vehicle 100 to rapidly enter the vehicle 100 into the exit lane 208.

When the determined acceleration to be applied to the vehicle 100 as the vehicle 100 enters the exit lane 208 is greater than the predetermined lowest acceleration and less than a predetermined highest acceleration, the vehicle 100 may perform the normal deceleration control for controlling to be decelerated so that the speed of the vehicle 100 becomes the predetermined safe speed in the curved lane 210 at the target point 502 of the curved lane 210.

Figure 9:
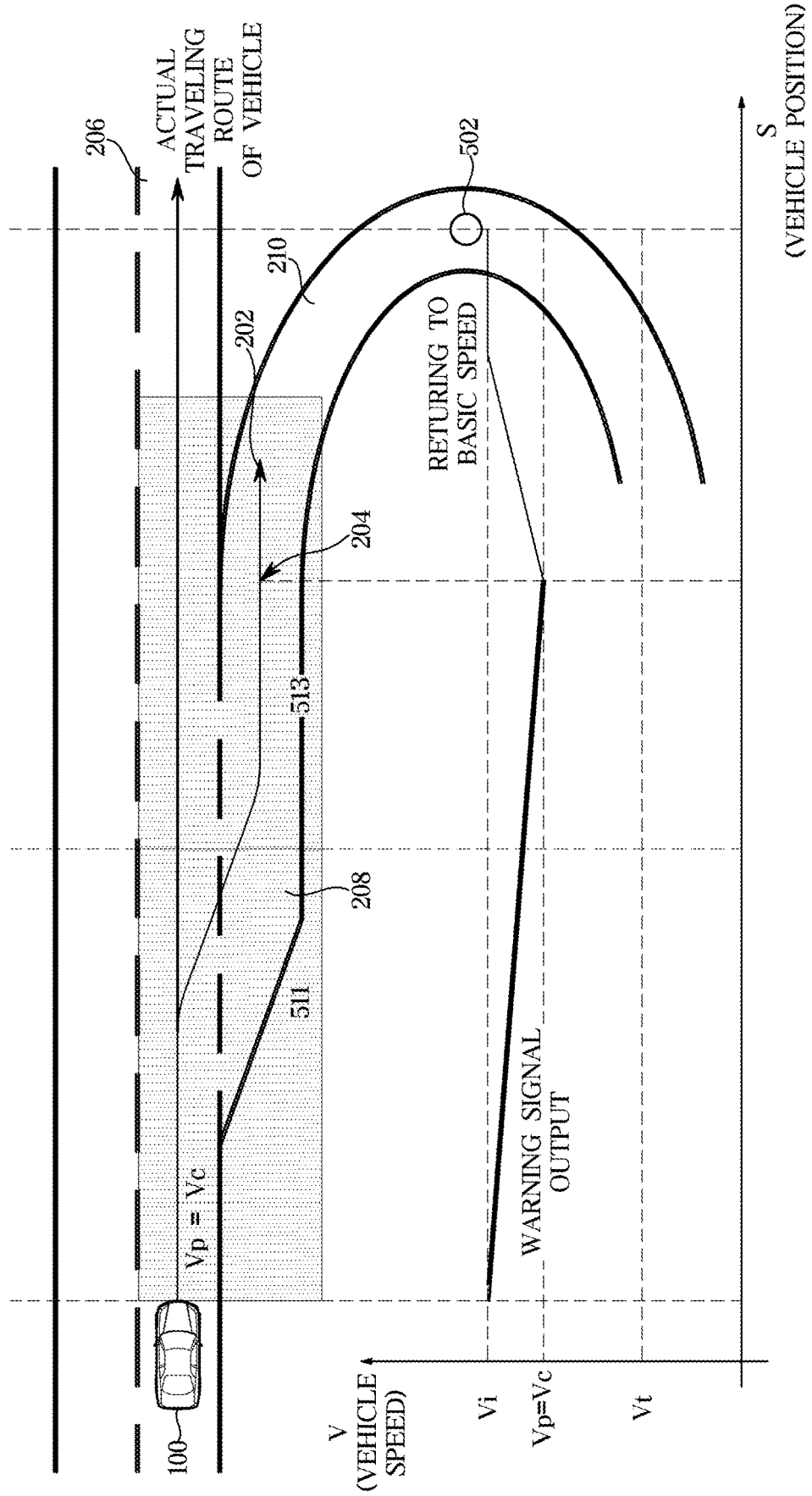

FIG. 9 is a diagram for explaining the operation of the vehicle 100 when the vehicle 100 continues to travel in the main line 206 unlike the route information 202 set by the navigation device 102 and the vehicle 100 identifies that the second speed Vr is greater than the first speed Vc.

Hereinafter, it is referred to as a third condition that the vehicle 100 continues to travel in the main line 206 unlike the route information 202 set by the navigation device 102 and the vehicle 100 identifies that the second speed Vr is greater than the first speed Vc.

As illustrated in FIG. 9, when the vehicle 100 travels according to the third condition, a graph of the vehicle speed V for the vehicle position S may be generated.

Referring to FIG. 9, when the vehicle 100 is located at the predetermined first distance from the branching point 204 while traveling in the main line 206 right next to the exit lane 208 for entering the curved lane 210, the vehicle 100 may perform the operation 511 in the pre-entry control mode for controlling the speed of the vehicle 100 to be decelerated so that the speed of the vehicle 100 becomes the second speed Vr.

When the vehicle 100 continues to travel to the main line 206 according to the manipulation of the driver unlike the route information 202 set by the navigation device 102, the vehicle 100 may identify that the vehicle 100 has deviated from the route information 202 set by the navigation device 102 after the branching point 204. Accordingly, the vehicle 100 may control to increase the speed of the vehicle 100 so that the speed of the vehicle 100 becomes the predetermined basic speed.

Figure 10:
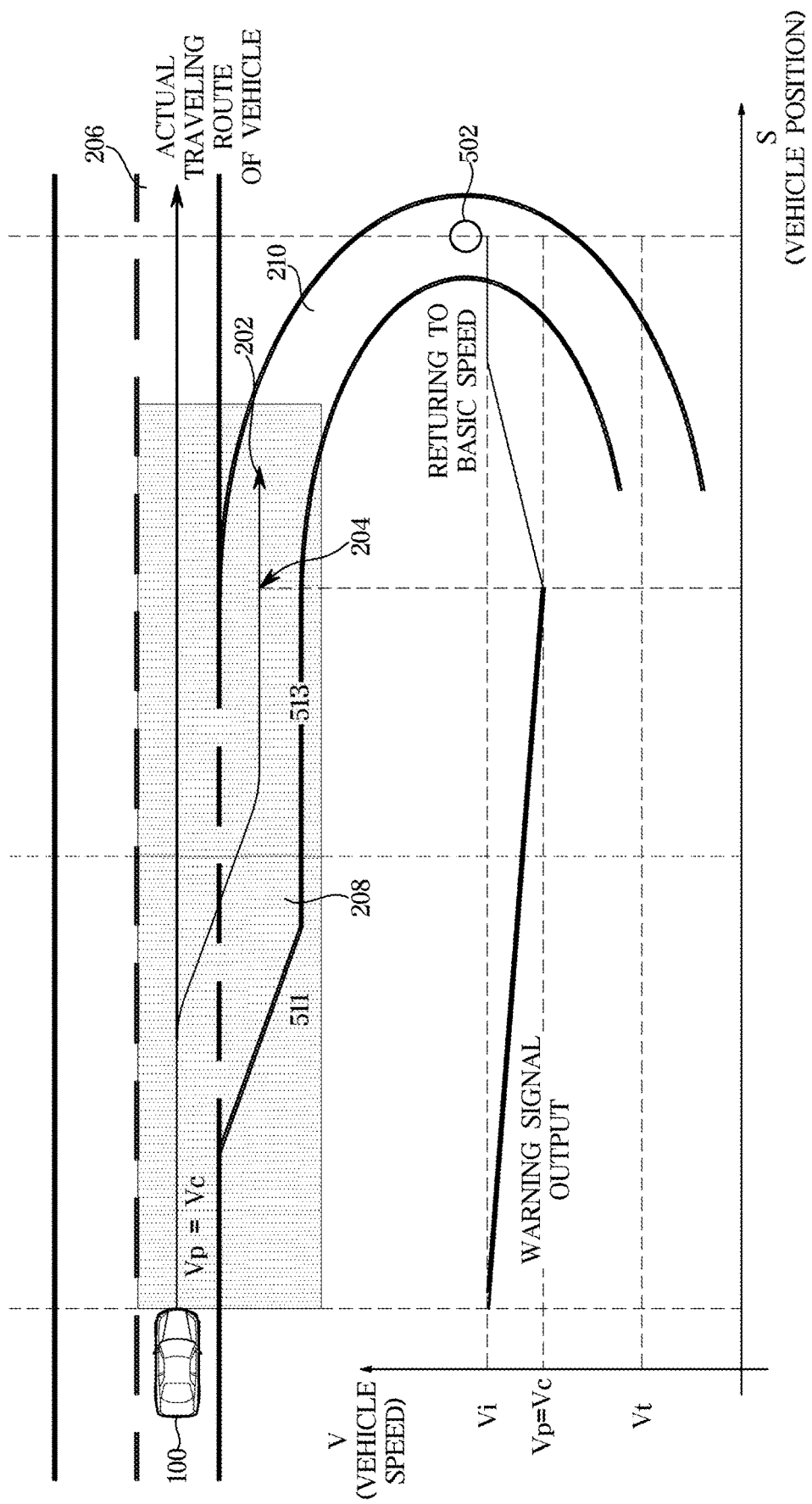

FIG. 10 is a diagram for explaining the operation of the vehicle 100 when the vehicle 100 continues to travel in the main line 206 unlike the route information 202 set by the navigation device 102 and the vehicle 100 identifies that the first speed Vc is greater than the second speed Vr.

Hereinafter, it is referred to as a fourth condition that the vehicle 100 continues to travel in the main line 206 unlike the route information 202 set by the navigation device 102 and the vehicle 100 identifies that the first speed Vc is greater than the second speed Vr.

As illustrated in FIG. 10, when the vehicle 100 travels according to the fourth condition, a graph of the vehicle speed V for the vehicle position S may be generated.

Referring to FIG. 10, when the vehicle 100 is located at the predetermined first distance from the branching point 204 while traveling in the main line 206 right next to the exit lane 208 for entering the curved lane 210, the vehicle 100 may perform the operation 511 in the pre-entry control mode for controlling the speed of the vehicle 100 to be decelerated so that the speed of the vehicle 100 becomes the first speed Vc. In the instant case, an entry timing of the vehicle 100 into the exit lane 208 is delayed, so that the speed of the vehicle 100 in the curved lane 210 may not match the predetermined safe speed in the curved lane 210. Accordingly, the vehicle 100 outputs a warning signal for a predetermined time period when located at the first distance, so that the vehicle 100 may induce the driver to manipulate the steering wheel and the like of the vehicle 100 to rapidly enter the vehicle 100 into the exit lane 208.

When the vehicle 100 continues to travel to the main line 206 according to the manipulation of the driver unlike the route information 202 set by the navigation device 102, the vehicle 100 may identify that the vehicle 100 has deviated from the route information 202 set by the navigation device 102 after the branching point 204. Accordingly, the vehicle 100 may control to increase the speed of the vehicle 100 so that the speed of the vehicle 100 becomes the predetermined basic speed.

Figure 11:
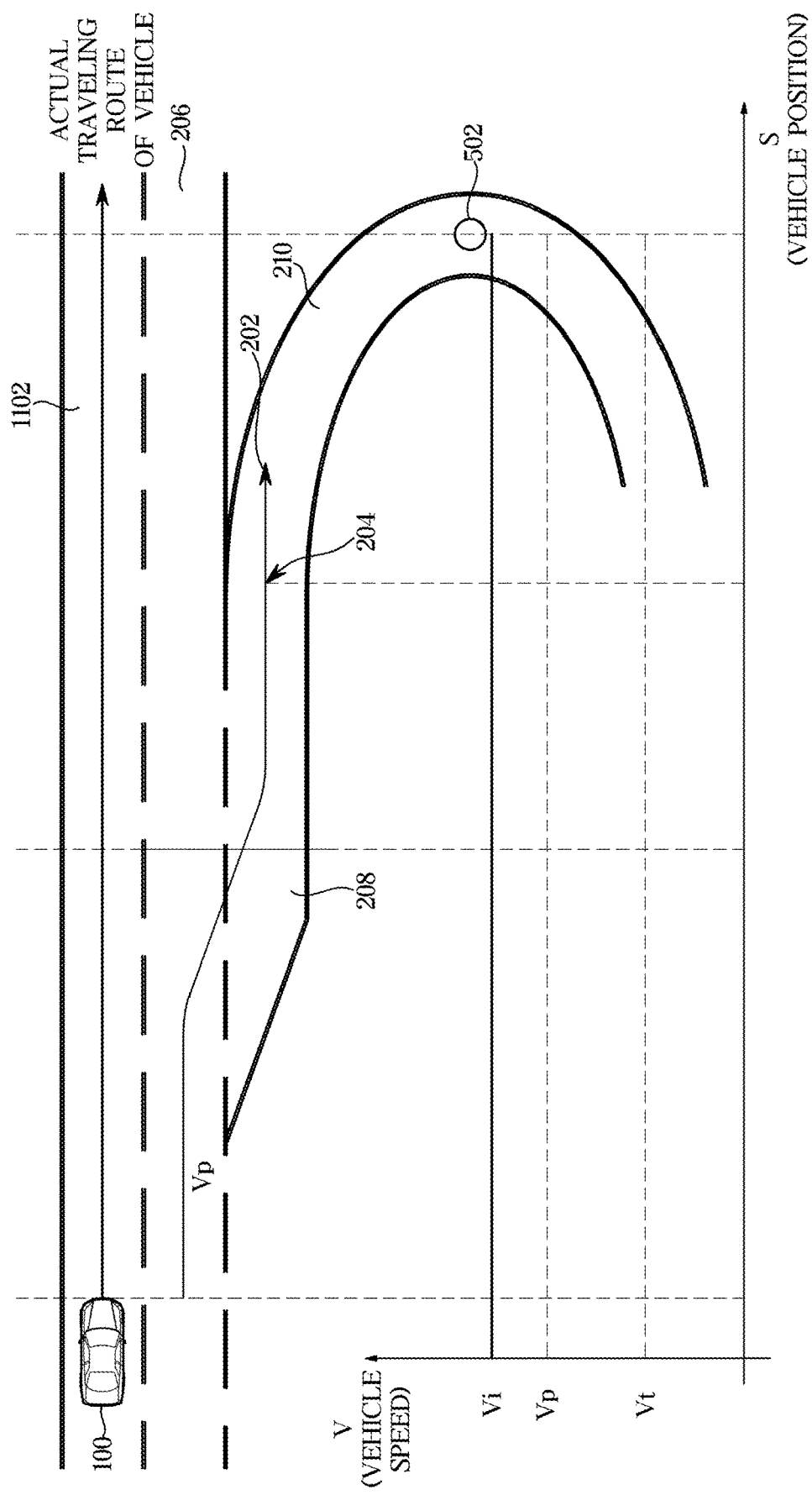

FIG. 11 is a diagram for explaining the operation of the vehicle 100 when the vehicle 100 continues to travel in a main line 1102 instead of the main line 206 right next to the exit lane 208.

Hereinafter, it is referred to as a fifth condition that the vehicle 100 continues to travel in a main line 1102 instead of the main line 206 right next to the exit lane 208.

As illustrated in FIG. 11, when the vehicle 100 travels according to the fifth condition, a graph of the vehicle speed V for the vehicle position S may be generated.

Referring to FIG. 11, when the vehicle 100 continues to travel in the main line 1102 instead of the main line 206 right next to the exit lane 208 unlike the route information 202 set by the navigation device 102, the vehicle 100 may identify that the vehicle 100 has deviated from the route information 202 set by the navigation device 102. Accordingly, the vehicle 100 may continue to travel at the predetermined safe speed.

Herein, the disclosed exemplary embodiments may be implemented in a form of a recording medium storing instructions executable by a computer. The instructions may be stored in a form of program code, and when executed by a processor, a program module may be generated to perform the operations of the included exemplary embodiments. The recording medium may be implemented as a computer-readable recording medium.

The computer-readable recording medium includes various kinds of recording media in which instructions which may be decrypted by a computer are stored. For example, there may be a Read Only Memory (ROM), a Random Access Memory (RAM), a magnetic tape, a magnetic disk, a flash memory, an optical data storage device, and the like.

As is apparent from the above, a vehicle and a control method thereof according to various aspects of the present invention can identify a driving condition of the vehicle while traveling to increase processing speed and/or efficiency of the vehicle.

For example, the vehicle and the control method thereof can control the vehicle through accurate determination by identifying the driving condition of the vehicle using a small resource of the vehicle, for example, a memory and/or a processor.

Furthermore, a vehicle and a control method thereof according to various aspects of the present invention can prevent collision with a rear vehicle or obstruction of the overall traffic flow due to a rapid deceleration of a traveling speed of the vehicle in a main line of a main road when a curve safety speed in an exit lane of the road is significantly low.

For example, the vehicle and the control method thereof can control the vehicle to travel without deceleration of the traveling speed of the vehicle due to a curved exit lane when the vehicle travels in a lane other than the last lane closest to the exit lane on the main line of the road.

For example, the vehicle and the control method thereof can control the vehicle to decelerate the speed of the vehicle to a safe speed in the curved exit lane when the vehicle travels in the last lane of the main line on a road where the last lane of the main line is the exit lane.

For example, the vehicle and the control method thereof can control the vehicle such that the vehicle is decelerated to a predetermined speed and then decelerated to the predetermined safe speed due to the curved exit lane after entering the exit lane because the vehicle may deviate without entering the exit lane when the vehicle travels in the last lane of the main line on a road where the exit lane next to the last lane of the main line is in a form of a pocket, that is, on a road including the exit lane for entering the curved lane, which is a separate lane from the main line, at a branching point of the road.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
    a navigation device; and
    a controller electrically connected to the navigation device,
    wherein the controller is configured:
        to determine a first speed of the vehicle based on a main line speed limit of a road on which the vehicle is traveling, wherein the main line speed limit is included in navigation information output by the navigation device,
        to determine a second speed for decelerating the vehicle to a predetermined speed when the vehicle is positioned at a target point of a curved lane based on:
            the predetermined speed and a predetermined allowable maximum deceleration amount in the curved lane in route information included in the navigation information; and
            an arc length from a branching point of the road to the curved lane calculated based on the navigation information, and
        to determine the first speed or the second speed as a control target speed of the vehicle at the branching point,
        wherein, when the vehicle continues to travel on the main line of the road without entering the curved lane guided by the navigation device, the controller controls the vehicle to continue traveling at the first speed without decelerating a speed of the vehicle to the second speed.

2. The vehicle of claim 1, wherein the controller is configured;
    to identify whether the branching point and the curved lane are included in recommended route information included in the navigation information, and
    to determine the first speed and the second speed based on the branching point and the curved lane included in the recommended route information.

3. The vehicle of claim 2, further including at least one of a camera and a radar,
    wherein the controller is configured:
        to identify a lane of the road in which the vehicle is traveling based on surrounding information of the vehicle obtained through the at least one of the camera and the radar, and
        to determine the first speed and the second speed based on the identified lane being a main line adjacent to an exit lane for entering the curved lane.

4. The vehicle of claim 3, wherein the controller is configured to control the speed of the vehicle to be a greater one of the first speed and the second speed when the vehicle is located at a predetermined first distance from the branching point in the identified lane.

5. The vehicle of claim 1, further including an output unit, wherein the controller is configured to determine the first speed as the control target speed and to control the output unit to output a warning signal, when the controller concludes that the first speed is greater than the second speed.

6. The vehicle of claim 5, wherein the controller is configured to determine the second speed as the control target speed when the controller concludes that the first speed is equal to or less than the second speed.

7. The vehicle of claim 6, wherein the controller is configured to determine an acceleration to be applied to the vehicle based on a predetermined first distance between the vehicle and the branching point, a current speed of the vehicle and the control target speed.

8. The vehicle of claim 7, wherein the controller is configured to determine the acceleration to be applied to the vehicle when the vehicle enters the branching point.

9. The vehicle of claim 8, wherein the controller is configured to control the output unit to output the warning signal when the determined acceleration is less than a predetermined lowest acceleration.

10. The vehicle of claim 1, wherein the controller is configured to control the speed of the vehicle when the vehicle enters an exit lane for entering the curved lane so that the speed of the vehicle becomes the predetermined speed when the vehicle enters the target point of the curved lane.

11. A method of controlling a vehicle, the method comprising:
    determining, by a controller, a first speed of the vehicle based on a main line speed limit of a road on which the vehicle is traveling, wherein the main line speed limit is included in navigation information output by a navigation device of the vehicle;
    determining, by the controller, a second speed for decelerating the vehicle to a predetermined speed when the vehicle is positioned at a target point of a curved lane based on:
        the predetermined speed and a predetermined allowable maximum deceleration amount in the curved lane in route information included in the navigation information; and
        an arc length from a branching point of the road to the curved lane calculated based on the navigation information; and
    determining, by the controller, the first speed or the second speed as a control target speed of the vehicle at the branching point,
    wherein, when the vehicle continues to travel on the main line of the road without entering the curved lane guided by the navigation device, the vehicle is controlled to continue traveling at the first speed without decelerating a speed of the vehicle to the second speed.

12. The method of claim 11, further including:
    identifying, by the controller, whether the branching point and the curved lane are included in recommended route information included in the navigation information,
    wherein the determining of the first speed and the second speed is performed based on the branching point and the curved lane being included in the recommended route information.

13. The method of claim 12, further including
identifying, by the controller, a lane of the road in which the vehicle is traveling based on surrounding information of the vehicle obtained through at least one of a camera and a radar,
wherein the determining of the first speed and the second speed is performed based on the identified lane being a main line adjacent to an exit lane for entering the curved lane.

14. The method of claim 13, further including:
controlling, by the controller, the speed of the vehicle to be a greater one of the first speed and the second speed when the vehicle is located at a predetermined first distance from the branching point in the identified lane.

15. The method of claim 11, wherein when the controller concludes that the first speed is greater than the second speed, the first speed is determined, by the controller, as the control target speed, and an output unit of the vehicle is controlled, by the controller, to output a warning signal.

16. The method of claim 15, wherein when the controller concludes that the first speed is equal to or less than the second speed, the second speed is determined by the controller as the control target speed.

17. The method of claim 16, further including:
determining, by the controller, an acceleration to be applied to the vehicle based on a predetermined first distance between the vehicle and the branching point, a current speed of the vehicle and the control target speed.

18. The method of claim 17, wherein the determining of the acceleration to be applied to the vehicle is performed when the vehicle enters the branching point.

19. The method of claim 18, further including:
controlling, by the controller, the output unit to output a warning signal when the controller concludes that the determined acceleration is less than a predetermined lowest acceleration.

20. The method of claim 11, further including:
controlling, by the controller, the speed of the vehicle when the vehicle enters an exit lane for entering the curved lane so that the speed of the vehicle becomes the predetermined speed when the vehicle enters the target point of the curved lane.

* * * * *